Figure 1:
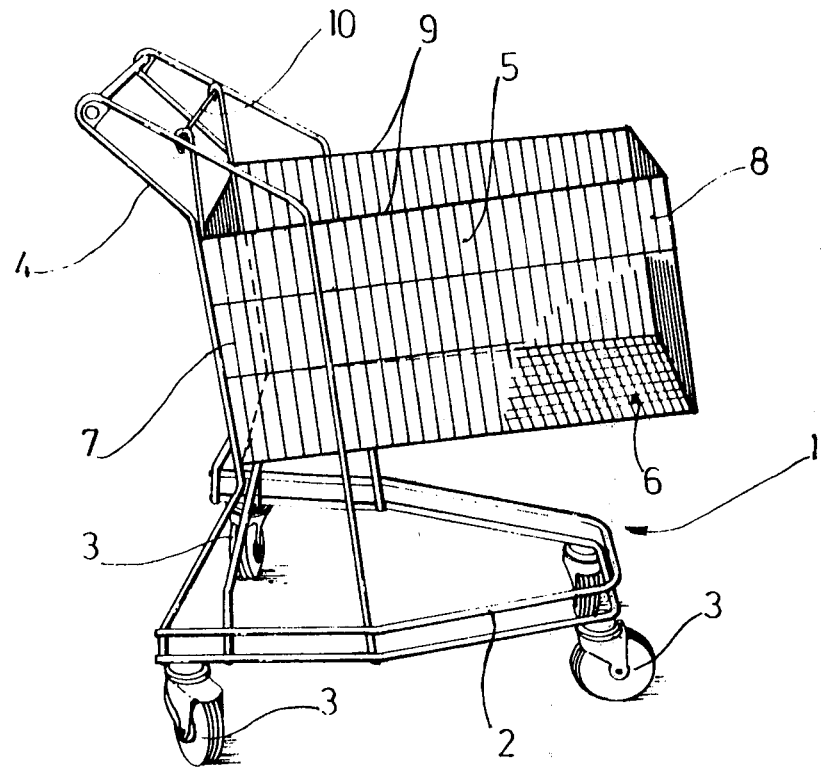

United States Patent [19]
Bruggeman

[11] 3,876,220
[45] Apr. 8, 1975

[54] SELF-SERVICE SHOPPING CART
[75] Inventor: Frans Bruggeman, Zulzeke, Belgium
[73] Assignee: N.V. Bekaert S.A., Zwevegem, Belgium
[22] Filed: Jan. 22, 1974
[21] Appl. No.: 435,524

[30] Foreign Application Priority Data
Jan. 31, 1973 Netherlands...................... 7301414

[52] U.S. Cl. ......................................... 280/33.99 S
[51] Int. Cl. ........................................... B62b 11/00
[58] Field of Search............ 280/33.99 TZ, 33.99 H, 280/33.99 S, 33.99 F, 33.99 T, 33.99 A, 33.99 B; 186/1 AC

[56] References Cited
UNITED STATES PATENTS
| | | | |
|---|---|---|---|
| 2,639,161 | 5/1953 | Goldman | 280/33.99 S |
| 2,689,134 | 9/1954 | La Chance | 280/33.99 S |
| 3,168,323 | 2/1965 | Hill, Sr. | 280/36 R |
| 3,739,878 | 6/1973 | Jay | 186/1 AC |
| 3,789,957 | 2/1974 | Close | 280/33.99 F X |

FOREIGN PATENTS OR APPLICATIONS
| | | | |
|---|---|---|---|
| 599,467 | 1959 | Italy | 280/33.99 S |
| 1,163,199 | 1958 | France | 280/33.99 F |

*Primary Examiner*—David Schonberg
*Assistant Examiner*—David M. Mitchell
*Attorney, Agent, or Firm*—Schlesinger, Arkwright, Garvey & Dinsmore

[57] ABSTRACT

A mobile self-service shopping cart. It comprises a base frame narrowing toward the front, a pulling or pushing frame mounted thereon and a basket for containing the goods to be transported. The basket includes a bottom section which rises obliquely and narrows toward the front and a swingable rear section. The front and side sections of the basket are rectangular and form a rectangular panel of wire mesh when in an unfolded position.

6 Claims, 2 Drawing Figures

SELF-SERVICE SHOPPING CART

The invention relates to a mobile self-service shopping cart comprising a base frame narrowing towards the front, a pulling or pushing frame mounted thereon and a basket for containing the goods to be transported. The bottom of the basket rises obliquely and narrows towards the front, and the rear section of the basket is swingable.

Self-service shopping carts of this type are apt for self-service shops and are generally known. The base frame narrows towards the front and the basket has the shape of a truncated pyramid to thereby permit the carts to engage drawback, however, nest into one another. A drawback, however, is that the side sections of the basket are of a complicated quadrangular or trapezoidal shape. The manufacture of similar side sections is a cumbersome and time-consuming operation.

On the other hand, the front section of the basket has in most cases a regular, for example a rectangular, shape. In addition, the mounting of the different elements of the basket requires the securement of said side sections to the front section. This securement is an additional operation.

The object of this invention is to provide a mobile self-service shopping cart which can be easily manufactured.

According to the invention and to that end, the basket's front and side sections of the self-service shopping cart of the aforementioned type form a rectangle in their unfolded position and consist of welded wire mesh. The great advantage resulting therefrom is that the front and side sections can be made of welded mesh that may be cut off from any ordinary roll of welded mesh without producing scrap. If the front and side sections according to the invention form one single rectangular panel of welded mesh in unfolded position, the formation of the basket's said front and side sections can be limited to one pressing operation of the rectangular welded mesh panel in the exact shape. It is obvious that the cost of the cart may be decreased in doing so because two very cumbersome and time-consuming operations are eliminated.

According to the invention it is also possible that both the front section and the side sections each consist of one rectangular welded mesh panel. It may in particular be observed that a number of carts according to the invention can engage into one another since the base frame of the cart and the bottom of the basket are properly manufactured to that end. Self-service shopping carts, whereby the basket has the shape of a rectangular box, or in other words, a basket which can be manufactured in a simple way, are generally known. The disadvantage of similar carts, however, is that they cannot engage into one another.

Since the side sections of the self-service shopping carts known to date are more irregular in shape, it is necessary to have the transverse and longitudinal wires of the welded mesh panels constituting said sections run obliquely and fan-like with respect to each other in order to avoid too wide and irregularly spaced openings in said side sections of the basket and to thereby prevent the goods contained in said basket from falling out. In the cart according to the invention, the longitudinal and transverse wires of the welded mesh panels constituting said sections cross each other rectangularly. It is obvious that another cumbersome operation is eliminated as a result thereof.

In order to be able to mount said side sections of the cart according to the invention easily and exactly, the dihedral angle formed between the bottom and the rear section of the basket shall preferably be substantially rectangular.

In order to obtain a well closed basket in the cart according to the invention and in order to make the engaging into one another possible, it is desirable that the rear section of the basket be pivotable about an axis of suspension that is situated above the side sections, or that the rear section pivots about either of the bordering edges of the side sections.

Figure 2:
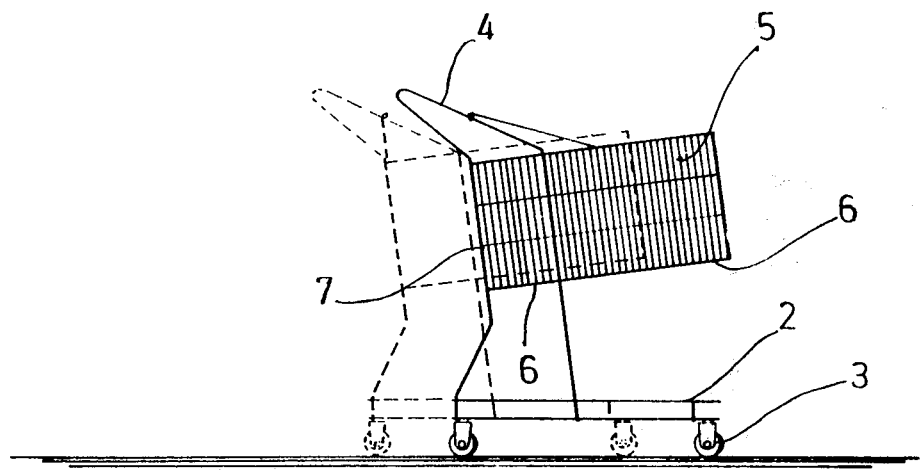

The invention will be further described with reference to the accompanying drawings in which:

FIG. 1 is a perspective view of a self-service shopping cart according to the invention, whereby part of a side section is broken away to clearly illustrate the obliquely rising and narrowing bottom of the basket, and FIG. 2 is a view of two carts according to the invention engaged into one another.

The self-service shopping cart 1 according to FIGS. 1 and 2 consists of a forwardly tapered base frame 2 that is provided with wheels 3. A pulling or pushing frame 4 is mounted on said base frame 2. Said pulling or pushing frame 4 is, in addition, a supporting frame for a basket 5 for containing the goods to be transported.

In order to make the engagement of said carts into one another possible, it is necessary that the bottom 6 of the basket 5 taper and slightly rise towards the front, and that the rear section 7 of the basket 5 be swingable.

The front section 8 and side sections 9 of the basket 5 form together a rectangular welded mesh panel in their unfolded position. Said welded mesh panel can easily be given the required shape by means of a pressure operation to form the side and front sections of the basket 5. Said front section 8 and side sections 9 are secured to the bottom 6 by means of any currently used procedure, for example welding.

It is obvious that the heights of the front section 8 and the side sections 9 need not be equal, and that it is also possible that both the front section 8 and the side sections 9 each consist of single rectangular welded mesh panels.

As is clear from FIG. 1, it is possible with the cart 1 according to the invention that the longitudinal and transverse wires of the side sections' welded mesh cross each other rectangularly without unwanted large openings being formed.

It also appears from FIG. 2 that the dihedral angle formed between the bottom 6 and the rear section 7 of the basket 5 is substantially rectangular.

The rear section 7 is pivotable about an axis of suspension 10 that is considerably above the uppermost wires of the front section 8 and the side sections 9. It will also be possible to make the rear section 7 pivot about a bordering edge of either of the side sections 9. Obviously, several modifications and variations of the present invention are possible.

What is claimed is:

1. A mobile self-service shopping cart comprising:
   a. a base frame narrowing in a forward direction,
   b. a pulling or pushing frame connected to and extending upwardly from said base frame,
   c. a basket mounted on said pulling or pushing frame, d. said basket including a bottom section obliquely rising and narrowing in the forward direction and a swingable rear section,
e. said basket including a front section and two substantially rectangular side sections adjacent said front section, said front and side sections having substantially coplanar top edges and substantially coplanar bottom edges,
f. said front and side sections comprising a folded rectangular panel of wire mesh,
g. said mesh being made of a plurality of parallel longitudinal wires parallel to said top and bottom edges and a plurality of parallel transverse wires perpendicular to said top and bottom edges and intersecting said plurality of longitudinal wires,
h. said mesh having substantially uniform openings bounded by said longitudinal and transverse wires,
i. said bottom section and said front section cooperating to form a substantially rectangular dihedral angle between them,
j. hinge means connected to said rear panel for pivotally supporting same,
k. said hinge means being spaced rearwardly and outwardly of said front section to permit horizontal nesting of like baskets.

2. The shopping cart of claim 1 and wherein said hinge means is positioned above said front section.

3. The shopping cart of claim 1 and wherein said rear section and said bottom section cooperate to define a substantially rectangular dihedral angle between them.

4. The shopping cart of claim 1 and wherein said hinge means is positioned above said side sections.

5. The shopping cart of claim 1 and wherein said front section is substantially rectangular.

6. The shopping cart of claim 5 and wherein said front section connects with said side sections about a pair of folds in said panel lying parallel to said transverse wires.

* * * * *